United States Patent [19]

Busi

[11] 3,877,497

[45] Apr. 15, 1975

[54] MACHINE FOR THE DEPOSITION OF MEASURED AMOUNTS OF SOFTENED THERMOPLASTIC MATERIAL INTO CLOSURE CAPS

[76] Inventor: Ettore Busi, 191 Via Selice, Imola, Italy, 40026

[22] Filed: Sept. 4, 1973

[21] Appl. No.: 393,778

[30] Foreign Application Priority Data
Sept. 8, 1972 Italy.............................. 12882/72

[52] U.S. Cl................... 141/138; 141/91; 222/420; 425/809
[51] Int. Cl.......................................... B65b 43/42
[58] Field of Search............... 141/8, 67, 82, 90, 91, 141/129, 138-153, 155-161, 167-191, 248, 250-284, 392; 222/420, 421, 422; 425/809, 126, 127, DIG. 34

[56] References Cited
UNITED STATES PATENTS
2,532,777  12/1950  MacKinnon......................... 141/148

*Primary Examiner*—Houston S. Bell, Jr.
*Attorney, Agent, or Firm*—Pollock, Philpitt & Vande Sande

[57] ABSTRACT

A machine for depositing measured amounts of thermoplastic material into inverted closure caps comprises an extrusion device which has a delivery outlet for a continuous flow of plastic material. At least one gripper unit is provided for cyclic movement along a closed path between a first position at which it strips off a plastics lump from the delivery outlet of the extrusion device and a second position at which it deposits the said lump into the inverted closure cap. The gripper unit is composed of a vertically slidable plunger and of a vertically slidable stripper element, both being movable independently the one from the other, so that in the first position the stripper projects below the plunger to effect the stripping of the lump, while in the second position the plunger is lowered and the stripper is raised so as to effect deposition of the said lump.

9 Claims, 6 Drawing Figures

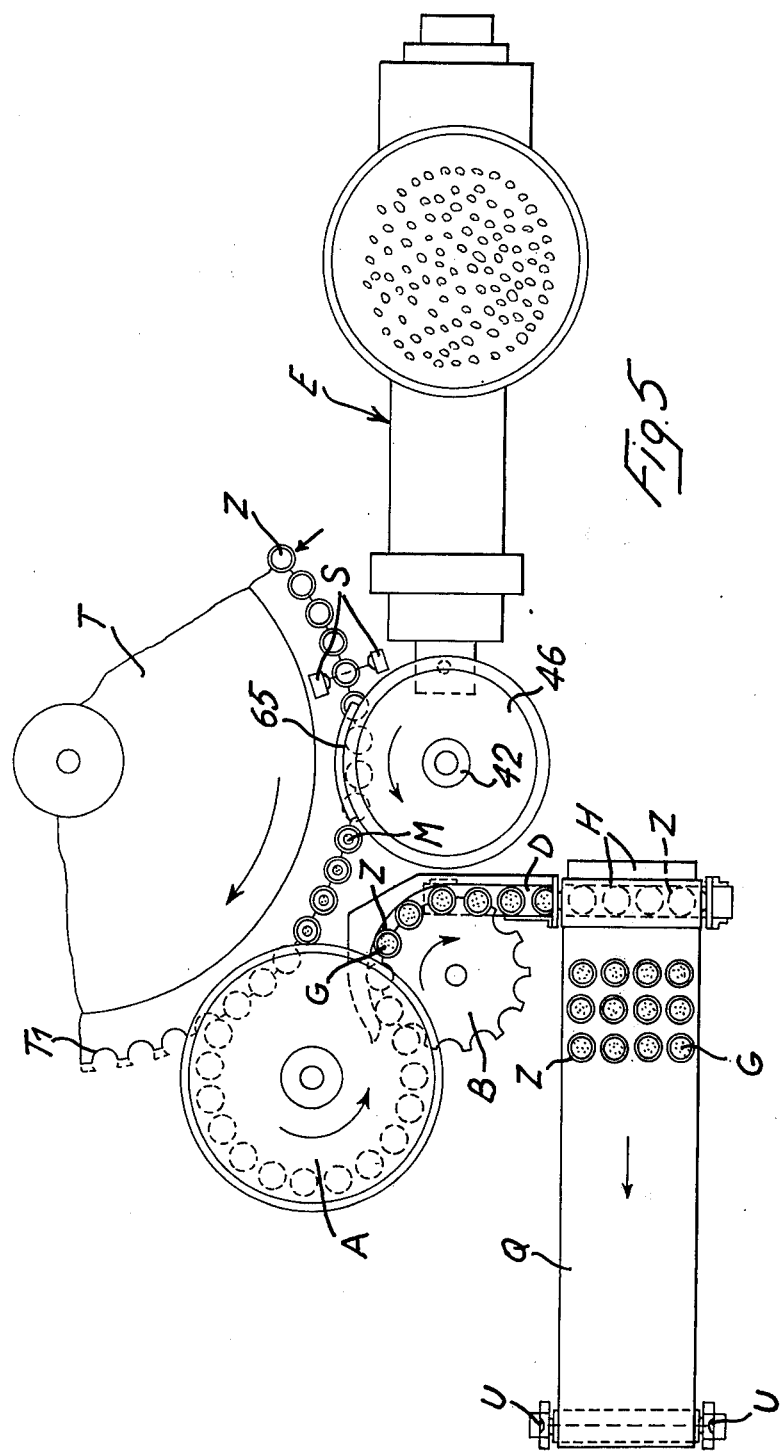

MACHINE FOR THE DEPOSITION OF MEASURED AMOUNTS OF SOFTENED THERMOPLASTIC MATERIAL INTO CLOSURE CAPS

BACKGROUND OF THE INVENTION

1. Field of the Invention

The invention relates to a machine for the deposition of measured amounts of softened thermoplastic material into closure caps, particularly in the production of plastic lining in such caps.

2. Description of the Prior Art

In the production of thermoplastic linings in closure caps a determined amount of molten, that is to say softened, plastically deformable thermoplastic material must be introduced into each individual cap and then pressed to form a lining for the latter. In this process it is important that the amount of plastic material introduced into each individual closure cap should be accurately measured and handled. According to my prior U.S. Pat. No. 3,702,148 a machine for carrying our this process includes a metering and delivering device for viscous or softened plastics lumps, and a suction gripper mounted for cyclic movement along a closed path and arranged for connection to a vacuum pipe for reception of one of the plastics lumps delivered by said metering device and for subsequent connection to a blast air pipe for discharging the plastics lump into a closure cap.

SUMMARY OF THE INVENTION

According to the invention, a machine for inserting measured amounts of molten thermoplastic material into closure caps comprises an extrusion device which has a delivery outlet for a continuous flow of viscous or softened plastics material, at least one gripper unit mounted for cyclic movement along a closed path between a first position at which the said unit device is disposed above and tangent to the delivery outlet of the extrusion device so as to strip or take off a measured amount of plastics material, and a second position at which the gripper unit is disposed centrally above an inverted empty closure cap (the hollow side of which is directed upwards), there being provided a vacuum pipe which communicates with the gripper unit when the unit is in the region of said first position, said gripper unit being composed of at least two parts provided with relative movement the one with respect to the other, so as to discharge the plastics lump into the closure cap without the need of a blast of air.

BRIEF DESCRIPTION OF THE DRAWINGS

FIG. 5 is a diagrammatic top plan view of a complete apparatus for producing linings in closure caps.

DESCRIPTION OF THE PREFERRED EMBODIMENT

Figure 1:
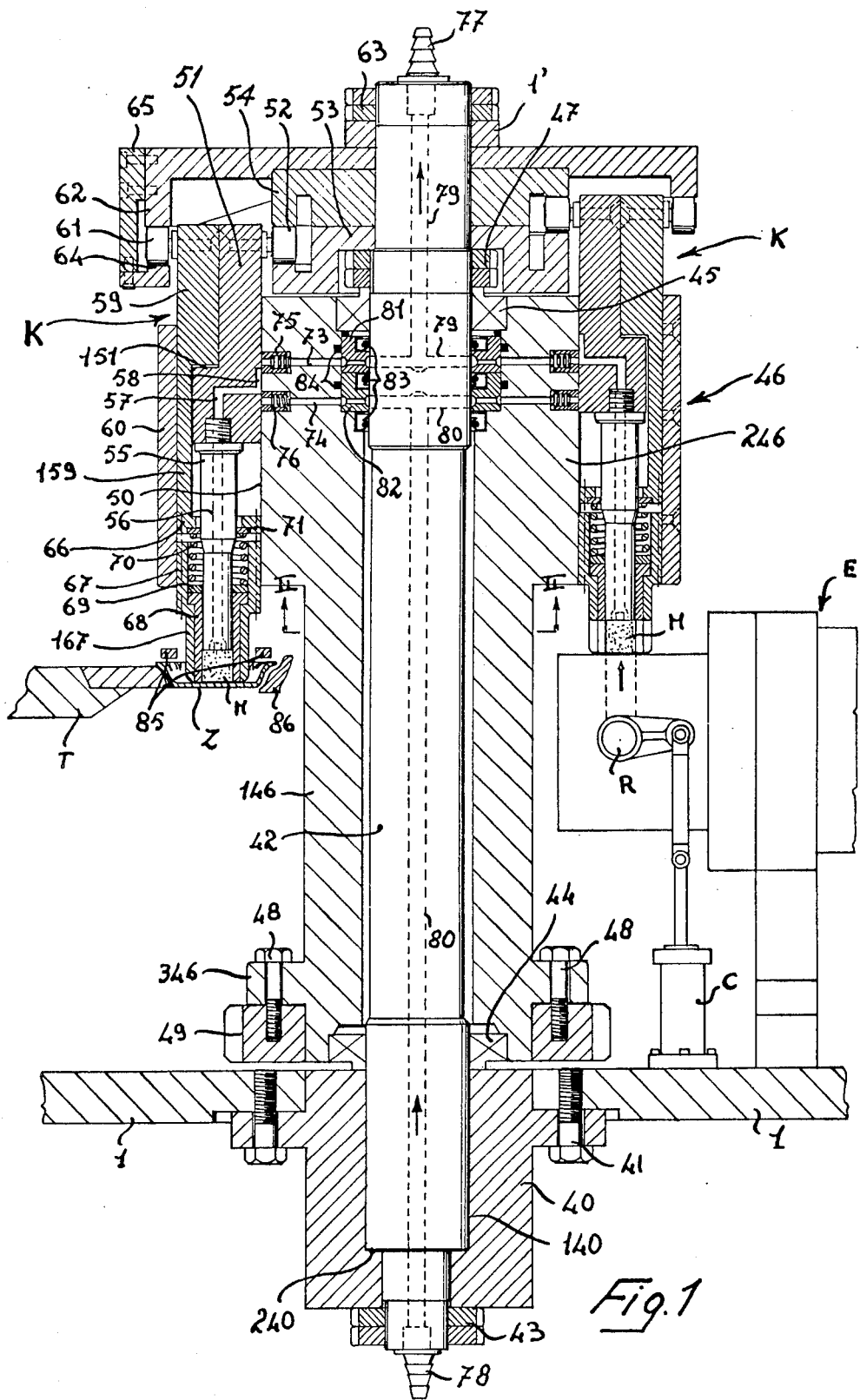
FIG. 1 is a vertical section of a machine according to the invention.

Referring to the drawings, a machine for inserting measured amounts of thermoplastic material in the molten state or softened to shaping temperature, into closure caps, comprises a base plate 1 of the machine frame, onto which there is fixed, through screws 41, the vertical supporting member 40. Inside the hollow space 140 there is mounted the lower end of the vertical shaft 42, bearing onto the inner step 240 of member 40, and projecting out of said supporting member with a reduced diameter section onto which there are screwed the locking ring nuts 43.

Onto shaft 42 there is rotatably mounted, through bearings 44 and 45, the rotating head or turret 46 having a lower cylindrical portion or stem 146, and an upper head section 246 shaped poligonally (in the embodiment shown, dodecagonal). A pair of ring nuts 47 lock in place the upper bearing 45.

The stem 146 presents a lower collar 346 onto which there is fixed, by means of screw 48, the toothed wheel 49 which cooperates with a suitable driving unit (not shown) for rotating the head or turret 46.

On the side faces of the polygonal head 46 there are obtained longitudinal recesses 50 inside which there are mounted axially (vertically) movable the units K for the stripping and the transfer of the amounts of plastic material into the caps.

Each unit K comprises a slide 51 which is housed partially inside recess 50, projecting upwardly from this latter and carrying laterally towards the interior a cam follower roller 52 which cooperates with the opposed tracks of two annular cams 53, 54, concentrically fixed onto shaft 42. Each slide 51 carries at its bottom a vertical plunger 55, which preferably has a circular section, and is provided with at least one inner longitudinal duct 56 which opens into one or more openings at the bottom end of said plunger. Duct 56 communicates with duct 57 provided in the slide 51 and opening towards the interior through a suitable longitudinal opening 58.

Slide 51 is provided towards the exterior with a shoulder 151 onto which there normally rests the correspondingly shaped portion of a second slide member 59 also axially slidable inside recess 50 and kept in place by a face plate 60. Each slide 59 projects out of the upper portion of recess 50 and carries laterally, towards the exterior, a cam follower roller 61 which is intended to cooperate with the annular track of an upper cam 62 which is fixed concentrically to shaft 42, with the interposition of supporting member 1', by means of the pair of ring nuts 63, which thus lock the annular cams 53, 54 and 62 onto the ring nuts 47.

During rotation of the turret head 46 the slide member 59 may be lifted independently with respect to slide 51, by a cam sector 64 secured by member 65 to cam 62.

Slide 59 carries a lower longitudinal element 159 which carries on its turn an annular supporting member 66 through which the plunger 55 passes. Below the supporting member 66, inside recess 50 there is positioned axially slidable a hollow sleeve 67 which terminates at its bottom with a cylindrical section length 167 and which is lined at its interior with a lining 68, preferably made of the plastic material known as TEFLON (Regd.

Trademark), or the like material. Plunger 55 is axially slidable inside sleeve lining 68.

Figure 2:
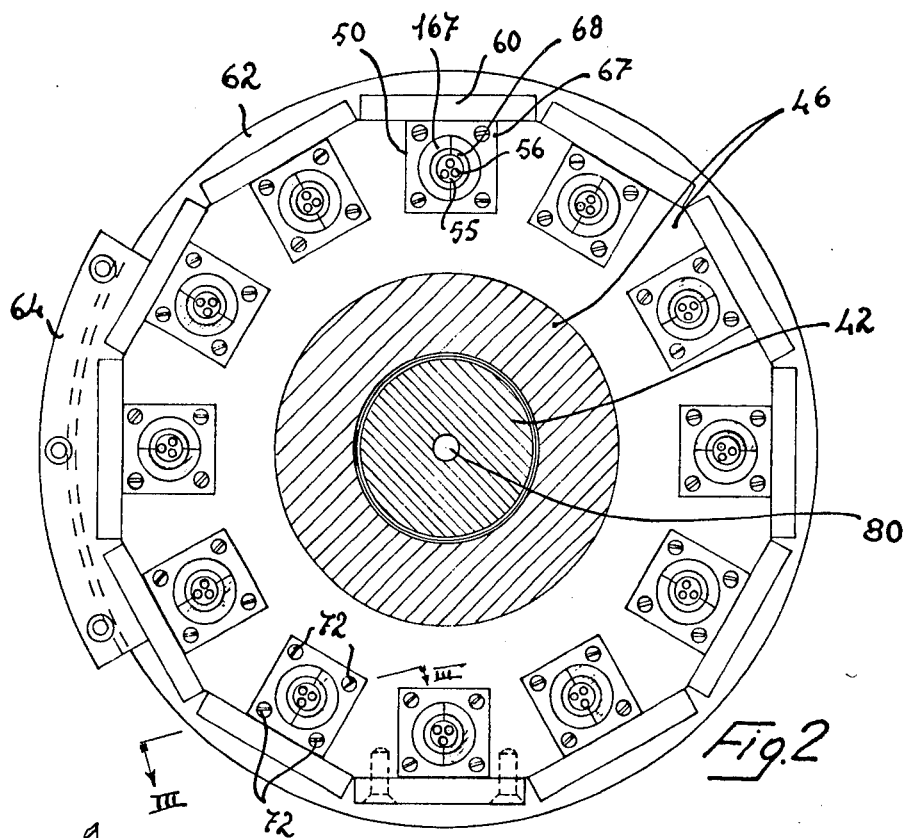
FIG. 2 is a plan view from the bottom, with parts in section, of the machine of FIG. 1, viewed in the direction of arrows II—II of FIG. 1.
Figure 3:
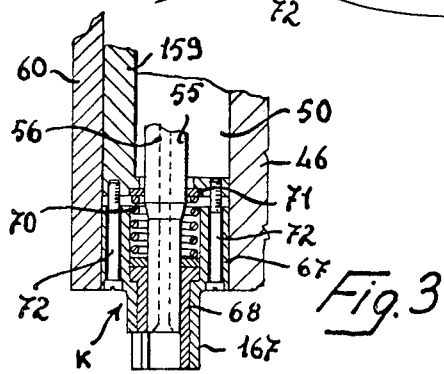
FIG. 3 shows a detail in section along lines III—III of FIG. 2 of a gripper unit according to the invention.

Lining 68 is locked in place by ring nut 69, onto which there bears a helical spring 70 which bears upwardly against ring 71 mounted onto supporting member 66. By means of suitable screws 72 (see FIGS. 2 and 3 particularly), slidable inside sleeve 67, the said sleeve 67 is connected to supporting member 66. By screwing more or less the screws 72, it is possible to adjust the height of the chamber formed by the lower section of the inner lining 68 and by the bottom end of plunger 55.

In accordance with the invention the lower cylindrical portion 167 of the sleeve 67 and the respective inner lining 68 are longitudinally open for an adequate length by an angle of 180° so as to present a semicylindrical surface, with their concavity directed in the direction of rotation of turret head 46.

In the course of the axial displacements of slide 51, the opening 58 of duct 56 of plunger 55 may be alternately brought into communication with either one of the two radial ducts 73, 74 obtained on turret 46. Suitable spring-urged bushing members 75, 76, preferably made of low-friction material, are provided to ensure the required air-tight sealing. An air blast source is connected at 78, while an air suction source is connected at 77. The air blast duct 80, obtained in shaft 42, terminates into duct 80, while the air suction duct 79, also obtained in shaft 42, terminates into duct 79. The air connection between fixed ducts 79, 80 and the rotatable ducts 73, 74, is obtained by means of a pair of superposed rings 81, 82, made of low-friction material, co-axially mounted onto shaft 42 and both provided on their inner and outer peripheral surfaces with annular grooves connected between them through radial bores. Suitable packings 83, 84 are provided to ensure the required air-tight sealing.

With reference to FIGS. 1 and 5, it is to be noted that at one point of the circular orbit of the units K of turret 46 there is provided, below said units, the delivery outlet of a device E for the continuous extrusion in upward direction of a flow of plastic mouldable material. The outlet of the distributor device E is interceptable through valve means R which is normally open and is connected through suitable lever connections to the stem of a piston of a double-effect cylinder piston unit C. At a correct distance from the extrusion device E there is arranged a continuous conveyor T in such a manner that the orbit of the units K comes to be tangent or secant with respect to the said continuous conveyor T, which is provided with seats T1 for housing the inverted caps Z, inside which the units K must deposit a lump of plastic material from the extrusion device E.

OPERATION OF THE PREFERRED EMBODIMENT

With reference to FIGS. 1 and 5, it is to be noted that the extrusion device E can be actuated so as to vary at will the flow of material being extruded, to establish a correct timing relationship between the speed of turret 46 and the said extrusion device, in order to have the correct amount of plastic material taken by the units K.

Upon rotation of the turret 46, units K reach the station at which they take the lump or amount of plastic material, with their components in the position as shown at the right-hand-side of FIG. 1. At this point, the lower portions 167–68 of units K, scrape or strip-off cyclically from the outcoming flow of extruded plastic material from the outlet of E a measured amount of said material and hold same firmly thanks to the suction taking place through the plunger 55.

Figure 4:
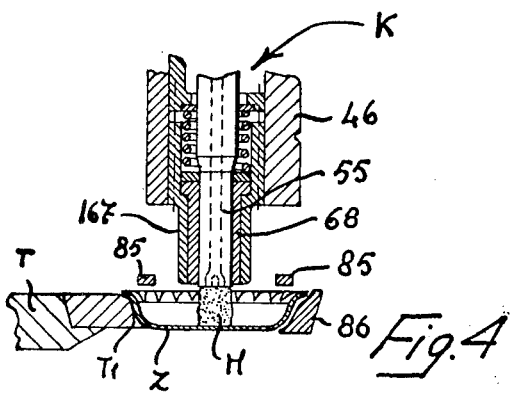
FIG. 4 shows in longitudinal section and with parts in view a gripper unit during the deposition step.

Upon further rotation of turret head 46, whenever the units K arrive in correspondence of an inverted cap Z, the slides 51 and 59 of said units K are lowered so as to bring the amount M of plastic material into contact with the bottom of cap Z. It is important to note, at this point, that the caps Z, when they arrive at the point of reception of the amount M of plastic material, are suitable heated (by conventional means not shown) and are coated in a usual manner on the surface which is intended to receive the plastic lump M, with a thin layer of any suitable thermo-adhesive substance, such as for example a vynil-base resin, or organosol layer. This particular treatment practically renders the surface of the cap sticky, so that the lump M brought into contact with same tends to adhere to it, even when the lower section 167–68 of the unit K is again lifted upwardly by slide 59 (FIG. 4), and also subsequently, when the plunger 55 is lifted upwardly by slide 51.

In order to avoid that, when lifting the plunger 55, the cap Z may be lifted because the lump M sticks to said plunger, suitable fixed guides 85 (see FIG. 1) are provided in correspondence of the conveyor T.

By lifting the lower stripping section 167–68 in advance with respect to plunger 55, it is avoided that the lump M of plastic material may still adhere to the said stripping section, and therefore it is avoided the use of a blast of air in order to detach the said lump M.

It is important to note that the use of a blast of air is not required for the deposition of the plastic material lump into the cap. This deposition takes place thanks to the lifting of the (stripping) elements 167–68 prior to the lifting of plunger 55, and thanks to the adhesion of the plastic lump to the sticky surface of the inverted cap, as soon as it comes into contact with said surface. From FIG. 1 (left-hand-side) it appears evident that, in the deposition stage, the duct 56 of the plunger is not connected to the blast air duct 74 (and 80). The use of the blast of air is instead regularly provided, after a certain period of time of operation of the apparatus, to clean the ducts and the parts which come in contact with the extruded plastic material.

Of course, if desired, the use of the air blast can be adopted also in the depositing stage, as described in my prior U.S. Pat. No. 3,702,148.

Figure 6:
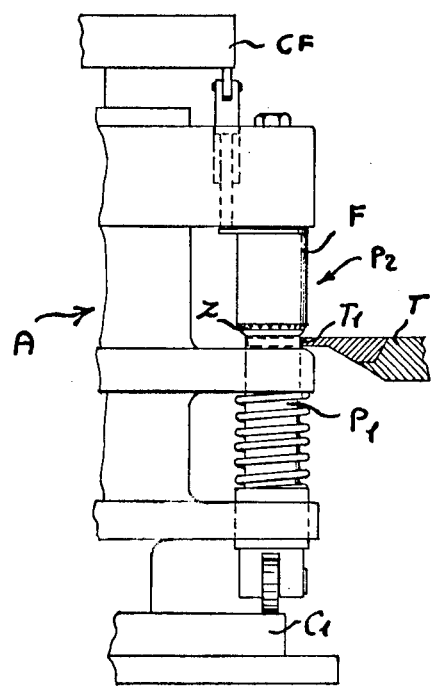
FIG. 6 shows in side elevation a detail of a machine for applying the liners of thermoplastic material into closure caps.

In FIG. 5 there is shown the arrangement of the machine as just described in the context of a plant for the production of lined caps. The inverted caps Z, after having received the proper amount of plastic material, are transferred by conveyor T onto an apparatus for forming the proper liners of thermoplastic material, such as the one disclosed in my prior U.S. Pat. No. 3,674,393, and generally indicated by A in the drawing (FIGS. 5 and 6). Thereafter, they are transferred onto a further conveyor G, to a belt conveyor D, and from this latter by a suitable pusher device H, onto another belt conveyor Q, in aligned rows of predetermined numbers. Suitable devices U, for counting the number of rows, and hence the number of caps, are provided. Further, on conveyor T, there are provided means S (such as for example a photocell operated device) which detect the possible absence of a cap Z in its seat on the conveyor, prior to the deposition stage, in which case they stop automatically the operation of the machine (rotation of turret 46 and closure of the outlet delivery of the extruder device E).

It is believed that the invention will have been clearly understood from the foregoing detailed description of the preferred embodiment. Changes in the details of construction may be resorted to without departing from the spirit of the invention, and it is accordingly my intention that no limitation be implied and that the hereto annexed claims be given the broadest interpretation to which the employed language fairly admits.

I claim:

1. A machine for inserting measured amounts of molten thermoplastic material into closure caps, comprising:
   a. an extrusion device provided with a delivery outlet for a continuous flow of viscous or softened plastic material;
   b. at least one gripper unit mounted for cyclic movement along a closed path between a first position at which the gripper unit is disposed above said delivery outlet and a second position at which the gripper unit is disposed centrally above an empty closure cap, the hollow side of which is directed upwards, said gripper unit comprising:
      b1. a vertical pin-like plunger mounted for longitudinal displacement within an eccentric recess in a rotating head rotatable about a vertical axis, said plunger being adapted to be raised in the region of the delivery outlet into a receiving position in which the plunger lies close above and in contact with its bottom end with the plastic material being extruded from the said delivery outlet, and being adapted to be lowered in the region of the closure cap into a discharge position in which it is close to said cap;
      b2. a vertical hollow cylindrical stripper element mounted for independent longitudinal displacement within the said eccentric recess, said plunger being slidable inside said cylindrical stripper element, said cylindrical stripper element terminating into a semicylindrical hollow portion adapted to co-axially project downwardly beyond the bottom end of the plunger when same is in its said raised position, so as to be tangent to the said delivery outlet, with its concavity directed in the direction of movement of the gripper unit, and adapted to be raised with respect to the bottom end of said plunger when same is in its lowered position in the region of the closure cap.

2. A machine according to claim 1, wherein annular stationary cam tracks are disposed above said rotating head and cooperating follower rollers are provided on the top end of slide members connected to the plungers.

3. A machine according to claim 1, wherein annular stationary cam tracks are disposed above said rotating head and cooperating follower rollers are provided on the top end of slide members connected to the stripper elements.

4. A machine according to claim 1, wherein the plunger is provided with a longitudinal bore which terminates at its bottom end and communicates with a vacuum pipe when the plunger is in the region of said first position.

5. A machine according to claim 1, wherein the plunger is provided with a longitudinal bore which terminates at its bottom end and communicates with an air blast pipe when the plunger is in the region of said second position.

6. A machine according to claim 1, wherein means are provided for adjusting the height of the semicylindrical chamber defined by the bottom end of the plunger and by the bottom edge of the hollow semicylindrical portion of the stripper element projecting beyond said bottom end of the plunger when same is in its raised position.

7. A machine according to claim 1, wherein stationary cam tracks are disposed above said rotating head and cooperating follower rollers are provided on the top end of slide members connected respectively to the plungers and to the stripper elements, whereby in the said first position at which the gripper unit is disposed above the delivery outlet, the plunger is raised while the semicylindrical hollow portion of the stripper is lowered with respect to the bottom end of the plunger so as to be tangent to the delivery outlet, and in the said second position at which the gripper unit is disposed centrally above the closure cap, firstly the plunger and the stripper element are lowered together, secondly the stripper element is raised with respect to the plunger, and eventually also the plunger is raised.

8. A machine according to claim 1, wherein retaining means are provided in correspondence of the region where the gripper unit is disposed above the inverted closure caps, in order to avoid the lifting of the caps when the gripper unit is again raised after the deposition of a plastic lump inside the cap.

9. A machine according to claim 1, in which means are provided sensitive to the presence of the caps in the discharge region, said means being capable to stop the operation of the machine and of the extrusion device.

* * * * *